United States Patent
Elias

(10) Patent No.: US 11,388,614 B2
(45) Date of Patent: Jul. 12, 2022

(54) MOBILE DEVICE AND INFRASTRUCTURE SYSTEMS

(71) Applicant: Fraunhofer Portugal Research, Oporto (PT)

(72) Inventor: Dirk Elias, Matosinhos (PT)

(73) Assignee: Fraunhofer Portugal Research, Oporto (PT)

( * ) Notice: Subject to any disclaimer, the term of this patent is extended or adjusted under 35 U.S.C. 154(b) by 1029 days.

(21) Appl. No.: 13/875,741

(22) Filed: May 2, 2013

(65) Prior Publication Data

US 2013/0244700 A1     Sep. 19, 2013

Related U.S. Application Data

(63) Continuation of application No. PCT/EP2011/069321, filed on Nov. 3, 2011.

(51) Int. Cl.

| | |
|---|---|
| *H04W 24/00* | (2009.01) |
| *G06K 17/00* | (2006.01) |
| *G01B 7/00* | (2006.01) |
| *H04W 12/06* | (2021.01) |
| *H04W 4/02* | (2018.01) |
| *G07C 9/28* | (2020.01) |

(Continued)

(52) U.S. Cl.
CPC ............ *H04W 24/00* (2013.01); *G01B 7/003* (2013.01); *G06K 17/00* (2013.01); *G07C 9/28* (2020.01); *H04W 4/026* (2013.01); *H04W 12/06* (2013.01); *H04W 12/50* (2021.01); *G01C 21/206* (2013.01)

(58) Field of Classification Search
CPC .. H04B 5/0081; H04B 5/0031; H04B 5/0062; H04B 5/0068; H04B 5/0075; H04B 7/0837; H04W 24/00; H04W 4/026; H04W 88/04; H04W 12/06; G01B 7/003; G06K 17/00; G07C 9/00111
See application file for complete search history.

(56) References Cited

U.S. PATENT DOCUMENTS

| | | | | |
|---|---|---|---|---|
| 4,308,620 A | * | 12/1981 | Grousseau | G01S 1/024 342/386 |
| 4,347,501 A | * | 8/1982 | Akerberg | G08B 25/016 340/506 |
| 4,958,695 A | | 9/1990 | Uchida et al. | |

(Continued)

FOREIGN PATENT DOCUMENTS

| | | |
|---|---|---|
| DE | 2953104 | 6/1988 |
| DE | 4441907 | 6/1995 |

(Continued)

OTHER PUBLICATIONS

Wikipedia, , "Near Field Communication", Wikipedia, The Free Encyclopedia, http://en.wikidpedia.org/w/index.php?title=Near_field_communication&oldid=394533741, Version Mar. 11, 2010, Mar. 11, 2010, 11 pp.

*Primary Examiner* — Srilakshmi K Kumar
*Assistant Examiner* — Jing Gao
(74) *Attorney, Agent, or Firm* — Perkins Coie LLP; Michael A. Glenn

(57) ABSTRACT

Magnetic field sensors of mobile devices are used for providing the mobile devices with information at a locally extremely restricted area in that, specifically, a magnetic field modulated with the information is locally generated at this position by an information signal generator.

35 Claims, 4 Drawing Sheets

(51) Int. Cl.
*H04W 12/50* (2021.01)
*G01C 21/20* (2006.01)

(56) References Cited

U.S. PATENT DOCUMENTS

| | | | | |
|---|---|---|---|---|
| 5,701,121 | A * | 12/1997 | Murdoch | H02J 50/12 |
| | | | | 340/10.34 |
| 5,917,425 | A | 6/1999 | Crimmins et al. | |
| 2005/0156587 | A1* | 7/2005 | Yakymyshyn | G01R 15/207 |
| | | | | 324/117 R |
| 2006/0103535 | A1* | 5/2006 | Pahlaven | G06K 7/0008 |
| | | | | 340/572.1 |
| 2008/0151692 | A1* | 6/2008 | Dijk | G01S 15/74 |
| | | | | 367/127 |
| 2009/0241040 | A1 | 9/2009 | Mattila et al. | |
| 2010/0141269 | A1* | 6/2010 | Quan | G01R 23/20 |
| | | | | 324/622 |
| 2010/0176918 | A1* | 7/2010 | Turner | G07C 9/00111 |
| | | | | 340/5.61 |
| 2011/0070837 | A1* | 3/2011 | Griffin | H04W 12/003 |
| | | | | 455/41.3 |

FOREIGN PATENT DOCUMENTS

| | | | | |
|---|---|---|---|---|
| DE | 10028328 | | 12/2001 | |
| FR | 2932302 | | 12/2009 | |
| WO | WO-2008086568 | | 7/2008 | |
| WO | WO-2011065931 A1 * | 6/2011 | | G01S 1/70 |

* cited by examiner

MOBILE DEVICE AND INFRASTRUCTURE SYSTEMS

CROSS-REFERENCE TO RELATED APPLICATIONS

This application is a continuation of copending International Application No. PCT/EP2011/069321, filed Nov. 3, 2011, which is incorporated herein by reference in its entirety, and additionally claims priority from German Application No. 102010043394.2, filed Nov. 4, 2010, which is also incorporated herein by reference in its entirety.

The present invention relates to an infrastructure system for a mobile device and to the mobile device itself, such as for the purpose of localizing and identifying mobile devices.

BACKGROUND OF THE INVENTION

Knowing the whereabouts of an object or a person enables utilization of a multitude of position-related services and applications. While outside of confined spaces, satellite-supported systems may be used for localization, other systems and techniques need to be used within confined spaces. In addition, transmission of an individual identification feature, such as a cryptographic key, for example, over a very short distance is a possibility of establishing tap-proof and encrypted communication via the internet.

There are various possibilities of meeting the above localization and identification feature transmission tasks. One may distinguish between potential large-range systems, which can typically cover several rooms, and low-range systems, which act within individual rooms. An HF system comprising time measurement may be employed, e.g., for localizing mobile devices. Said localization is performed by means of the time delay, i.e. the run time, of radio signals in a temporally synchronized environment having several transmitters or receivers. Accordingly, said localization is accurate, but also very high in expenditure, and the expenditure increases enormously when used inside of buildings.

However, HF systems may also exploit field-strength measurements so as to perform localization of a mobile device via the measured field strength at transmitters having known installation locations. Localization may be performed on the system to be localized, i.e. the receiver. Alternatively, measurement of the transmit signals of a system to be localized may be employed by several receivers having known installation locations. Even though the implementation expenditure is slightly reduced as compared to the above-mentioned possibility of time measurement for the purpose of localization, the same drawbacks essentially exist, namely the high expenditure and the problem involved in indoor localization.

For localization, there is also the possibility, of course, of performing a magnetic field vector measurement so as to conduct localization via measuring the field vectors of several artificial magnetic fields. However, the expenditure involved in producing the artificial magnetic fields is large.

Low-range systems may be based on image processing, for example. A room is detected by means of general features or by means of specifically attached markings, such as barcodes. However, said systems are error-prone or need to be operated by a disciplined user.

HF beacons and/or active or passive RFID systems may be employed for the above localization and identification tasks. Such a system communicates with weak electromagnetic fields with the system to be localized or identified. The implementation expenditure is slightly lower in this case due to the slightly reduced localization accuracy, but nevertheless proprietary components may be employed in order to implement the system.

There is also the possibility of utilizing infrared systems detecting by means of infrared communication the whereabouts of an object to be localized. For example, a transmitter or receiver may be provided at the object to be localized.

Examples of the above solutions have already existed in the market. Please refer to Ekahau, Aeroscout, NFC, Ivistar and Elpas, for example. In addition, implementations are described in DE10028328, DE4441907 and U.S. Pat. No. 4,958,645.

In order to increase accuracy, it is possible to combine the above large-range systems with the latter short-range systems.

For solving localization and identification tasks it would be desirable to have a concept requiring little investment expenditure and/or adaptation expenditure while being up to meeting, in particular, also the requirements arising inside of buildings. WLAN localization concepts, for example, indeed may involve low implementation expenditure since the infrastructure is already existent in most cases, but their indoor use still poses a large problem, which increases susceptibility to errors regarding, e.g., faulty localizations. Conversely, RFID concepts may involve large investment expenditure since the infrastructure is non-existent in most cases or, if it is existent, is not available to everybody.

SUMMARY

According to an embodiment, an infrastructure system for a mobile device may have: an information signal generator configured to generate a magnetic field modulated with information; a data interface for receiving a message from the mobile device via a high-frequency electromagnetic wave interface; and a processing unit configured to check the message for a match with the information, wherein the information signal generator is configured such that a modulation frequency at which the magnetic field is modulated with the information is lower than 1 kHz.

According to another embodiment, an in-house infrastructure system for a mobile device may have: a plurality of information signal generators which are configured to generate a magnetic field which is modulated in each case at a modulation frequency of less than 1 kHz with information which is different for the information signal generators.

According to another embodiment, a mobile device may have: a magnetic field sensor for detecting a magnetic field; an information extractor for extracting from the magnetic field information with which the magnetic field is modulated at a modulation frequency lower than 1 kHz; and a data interface for transmitting, via a high-frequency electromagnetic wave interface, a message which depends on the information.

According to another embodiment, a mobile device may have: a magnetic field sensor for detecting a magnetic field; an information extractor for extracting from the magnetic field location and/or identification information with which the magnetic field is modulated at a modulation frequency lower than 1 kHz; and a localizer for determining a position of the mobile device by means of the location and/or identification information.

Another embodiment may have a system of an infrastructure system as claimed in claim 1 and of a mobile device as claimed in claim 18.

Another embodiment may have a system of an infrastructure system as claimed in claim 12 and of a mobile device as claimed in claim 23.

According to another embodiment, a method of providing an infrastructure for a mobile device may have the steps of generating a magnetic field modulated with information at a modulation frequency lower than 1 kHz; receiving a message from the mobile device via a high-frequency electromagnetic wave interface; and checking the message for a match with the information.

According to another embodiment, a method of operating a mobile device including a magnetic field sensor for detecting a magnetic field may have the steps of: extracting from the magnetic field information with which the magnetic field is modulated at a modulation frequency lower than 1 kHz; and transmitting, via a high-frequency electromagnetic wave interface, a message which depends on the information.

According to another embodiment, a method of operating a mobile device including a magnetic field sensor for detecting a magnetic field may have the steps of: extracting from the magnetic field location and/or identification information with which the magnetic field is modulated at a modulation frequency lower than 1 kHz; and determining a position of the mobile device by means of the location and/or identification information.

According to another embodiment, a computer program may have: a program code for performing the method of providing an infrastructure for a mobile device, which method may have the steps of: generating a magnetic field modulated with information at a modulation frequency lower than 1 kHz; receiving a message from the mobile device via a high-frequency electromagnetic wave interface; and checking the message for a match with the information, when the program runs on a computer.

According to another embodiment, a computer program may have: a program code for performing the method of operating a mobile device including a magnetic field sensor for detecting a magnetic field, which method may have the steps of: extracting from the magnetic field information with which the magnetic field is modulated at a modulation frequency lower than 1 kHz; and transmitting, via a high-frequency electromagnetic wave interface, a message which depends on the information, when the program runs on a computer.

According to another embodiment, a computer program including a program code for performing the method of operating a mobile device including a magnetic field sensor for detecting a magnetic field, which method may have the steps of: extracting from the magnetic field location and/or identification information with which the magnetic field is modulated at a modulation frequency lower than 1 kHz; and determining a position of the mobile device by means of the location and/or identification information, when the program runs on a computer.

The observation underlying the present invention consists in that magnetic field sensors already exist in most cases in today's mobile devices, such as in the form of Hall sensors or the like, namely in addition to an ability, which in most cases exists anyway, to communicate and/or to transmit information via a high-frequency electromagnetic wave interface, such as WLAN, GSM or the like. Examples of such mobile devices are mobile phones or portable multimedia reproduction devices or the like. One idea underlying the present invention consists in that the magnetic field sensors of said mobile devices may be used for providing the mobile devices with information at a locally extremely restricted area, specifically by locally producing a magnetic field, modulated with said information, at this position by means of an information signal generator. Due to its further high-frequency electromagnetic wave interface, the mobile device is able to transmit a message which depends on said information to a central station, such as a processing unit of the infrastructure system, which may subsequently check, for example, whether the message matches the information, so as to determine, for example, that the mobile device is located within the cell and/or the magnetic field of the respective information signal generator. The infrastructure system may take various measures which depend on this check, such as localization, information transmission to the mobile device, triggering an alarm signal, granting access, etc. Alternatively, it is possible for the mobile device itself to already determine its position while exploiting the exact local definition of the magnetic field cell of the information signal generator and the information of the magnetic field modulation, in which case the mobile device itself need not be equipped with a high-frequency electromagnetic wave interface. The local restriction of the availability of magnetic field modulation further enables transmitting information to a device located within the respective cell in a targeted manner and without too high a risk of an interception on the part of unauthorized third parties. This may also be exploited in a corresponding in-house infrastructure system.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
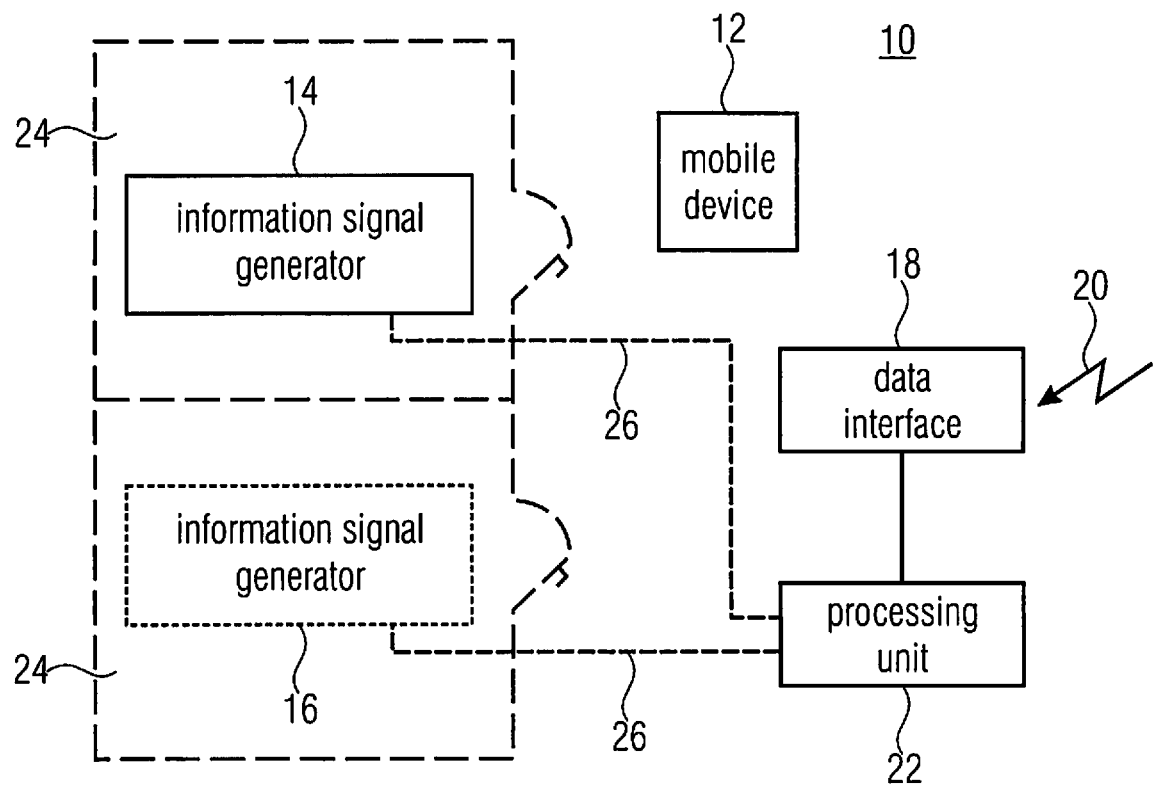
FIG. 1 shows a block diagram of an infrastructure system in accordance with an embodiment of the present application.

FIG. 1 initially shows an infrastructure system generally indicated by reference numeral 10. The infrastructure system 10 serves one or more mobile devices, a mobile device 12 being shown in FIG. 1 by way of example. The infrastructure system 10 of FIG. 1 includes at least one information signal generator 14 configured to generate a magnetic field modulated with information, specifically—as will be described below—at with low frequency at a modulation frequency of, e.g., less than 1 kHz or even less than 200 Hz and, in accordance with embodiments described below, even less that 50 Hz. A further information signal generator 16, which may optionally exist and uses, e.g. for modulation, information which differs from the information of the information signal generator 14, is also shown by way of example in FIG. 1. The information may be location and/or identification information, for example, i.e. it may indicate a location where the respective information signal generator 14 or 16 is positioned, or it may indicate an ID of the respective information signal generator 14 or 16 which is, e.g., unambiguously associated with the latter.

The infrastructure system 10 further includes a data interface 18 for receiving a message from the mobile device 12 via a high-frequency electromagnetic wave interface 20, such as an optical link, a radio link or a link to the internet, to which the mobile device 12 is also linked via a high-frequency electromagnetic wave wireless path 20.

Figure 5:
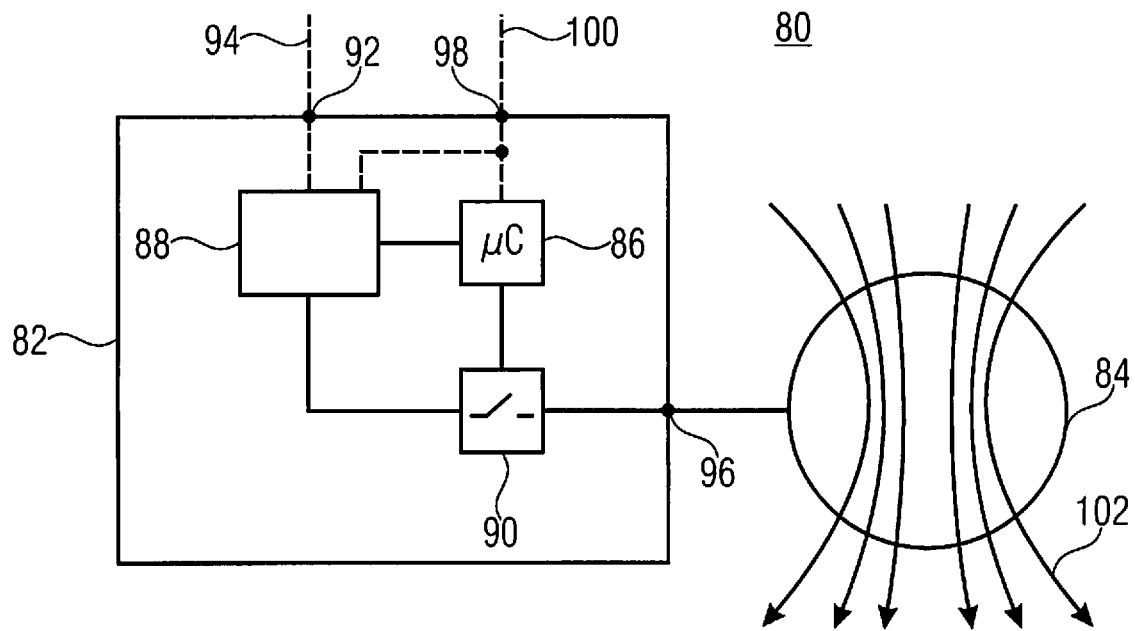
FIG. 5 shows a block diagram of an information signal generator in accordance with an embodiment.
Figure 6:
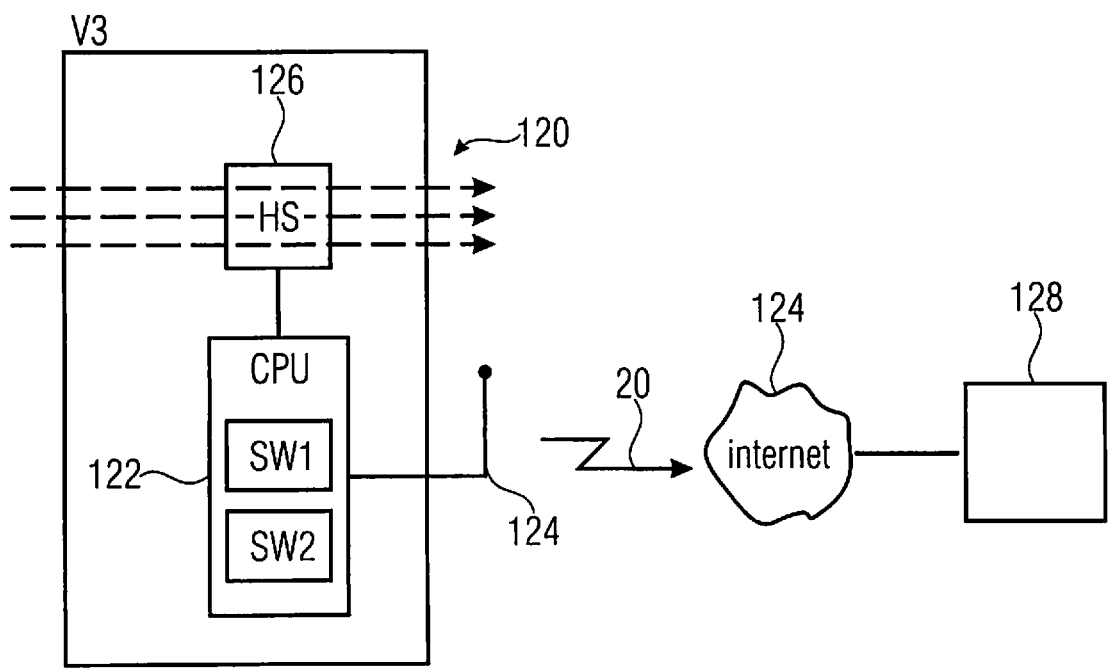
FIG. 6 shows a block diagram of a mobile device in accordance with a further embodiment.
Figure 7:
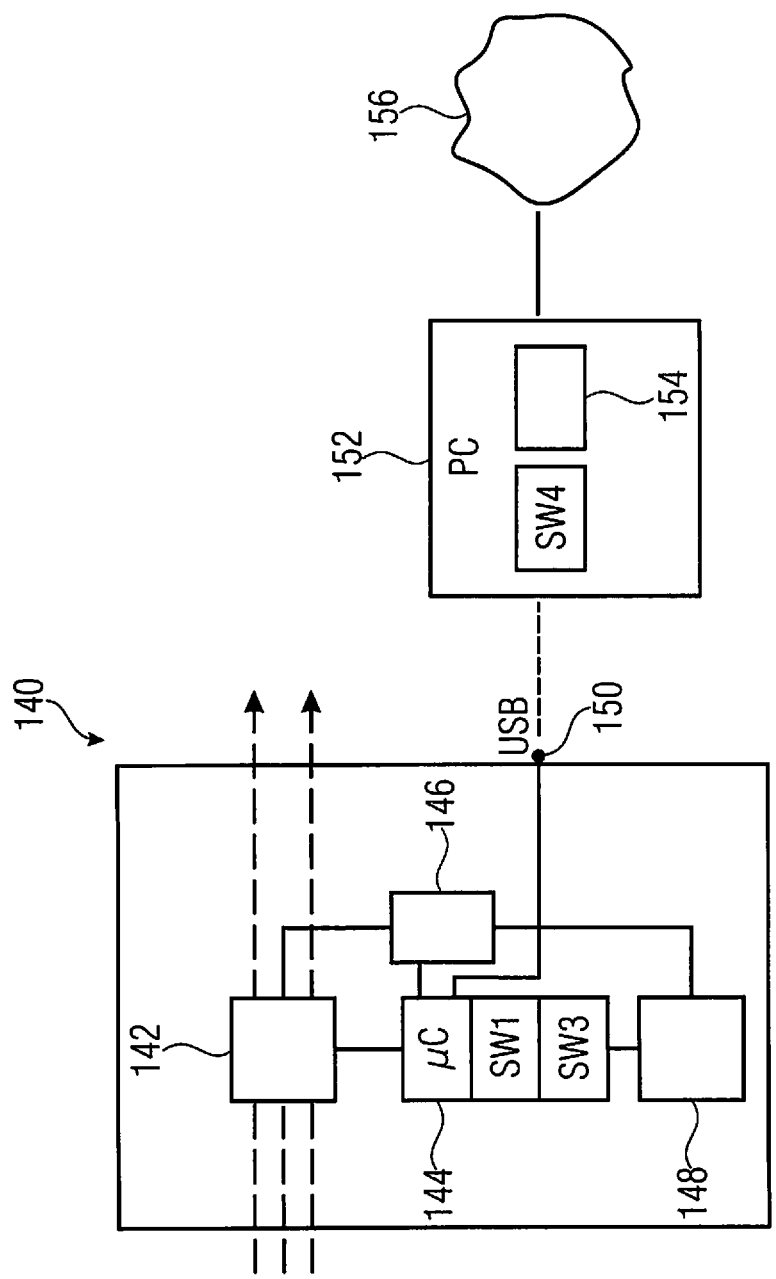
FIG. 7 shows a block diagram of a mobile device in accordance with a further embodiment.

With reference to FIGS. 5 to 7, one embodiment will be described below for each of an information signal generator and a mobile device, respectively, wherein the internet is used for forwarding the information transported via the high-frequency electromagnetic wave wireless path 20. The processing unit 22 may thus be located at any location or may even be distributed across several locations, such as across computers of a computer network, for example, and may also be locally separate from the data interface 18, which in turn may represent one of a multitude or plurality of data interfaces. In other words, there may possibly be even many processing units which may possibly also be coupled, e.g. via the internet. The link between 22 and 14/16 may thus be short, but possibly also long, for example it may be via the internet.

Eventually, the infrastructure system 10 further includes a processing unit 22 configured to check the message from the mobile device 12 for a match with the information with which the magnetic field of the information signal generator 14 or 16 is modulated.

The infrastructure system of FIG. 1 may be employed for different purposes. For example, the processing unit 22 may check, with the help of the message, where the mobile device 12 is located. To this end, for example, the mobile device 12 forwards the information from the magnetic field modulation to the processing unit 22 via the interface 20 and the data interface 18, which processing unit 22 may unambiguously associate said information with the respective information signal generator and may thus restrict the position of the mobile device 12 to the cell within which the magnetic field of the respective information signal generator 14 is sufficient to be recognized and evaluated by the mobile device 12. It is advantageous that magnetic fields having a locally extremely accurate circumference may be generated. The cells of the individual information signal generators 14 and/or 16 may therefore be arranged, for example, as desired, e.g. may be seamlessly stitched and/or without any overlap or the like, so that the cell boundaries coincide with walls, ceilings or floors of rooms 24 of a building, as is indicated in FIG. 1.

The information used by the information signal generators 14 for magnetic field modulation, however, are not necessarily limited to location and/or ID information. While location and/or ID information is transmitted, e.g., in a cyclically repeated manner, the processing unit 22 may additionally instruct, via a corresponding communication channel 26, the respective information signal generator 14 and/or 16, within whose cell the mobile device 12 is currently located, to forward a dedicated message to the mobile device 12 in that the respective generator 14 and/or 16 modulates the magnetic field with said message. In addition, it is possible for the information used by the respective information signal generator 14 and/or 16 for magnetic field modulation to include a key, namely a cryptographic key, which is then used, e.g., for encrypted communication via the interface 20, specifically from the mobile device 12 to the data interface 18 and/or vice versa.

In particular, the infrastructure system 10 may thus be used within the context of an indoor navigation system. In this case, the processing unit 22 would either communicate—e.g. upon determining the cell and/or the information signal generator within whose cell the mobile device 12 is currently located—this position to the mobile device 12, wherein, in turn, a corresponding processing unit would look up a map, by means of this position, so as to submit, e.g., a navigation proposal to a user of the mobile device 12, or the processing unit 22 itself would look up a map by means of the position and forward the navigation proposal to the mobile device 12 via the interface 20.

However, the processing unit 22 might also utilize the knowledge that the mobile device 12 is located in the cell of a specific information signal generator 14 in order to implement access control. For example, upon successfully checking the message of the mobile device 12 via the interface 20, namely that the message matches the information of the respective information signal generator 14, and possibly upon checking that the message of the mobile device 12 includes an ID of the mobile device 12 which belongs to a specific authorized group, the processing unit 22 might grant access to a room otherwise not accessible in that the processing unit 22 opens a corresponding door, for example, or the like. Similarly, the infrastructure system 10 of FIG. 1 might implement time recording in that the processing unit 22 records, for example, the time duration during which the mobile device 12 is located within a cell or a specific group of cells of specific information signal generators. Quite generally, it is in this manner that the processing unit 22 might implement specific building automation. It would also be possible, of course, for the processing unit 22 to check the received messages along the lines of predetermined security criteria in terms of whether there have been any security lapses, such as the presence of a specific device 12 within a cell within which the device is not allowed to be located at this point in time.

As was already mentioned above, it is also possible for the processing unit 22 to transmit user-specific information to the mobile device 12 in a location-dependent manner, i.e. dependently on the recognized information signal generator cell. This transmission may be effected both via magnetic field modulation and the communication channel 26 and via the interface 20. Said user-specific information might include, e.g., advertising for the mobile device 12. However, it is also possible for the processing unit 22 to specifically address user interface devices, such as display units or loudspeakers, which are located in the vicinity of the current position of the user, so that the user obtains, via such additional display units or loudspeakers or the like which are located in the user's vicinity, information intended for him/her or tailored to him/her, i.e. personalized information such as advertising or the like.

However, specific payment functions might also be performed by the processing unit 22 in dependence on whether or not the mobile device 12 is located within a respective information signal generator cell.

The processing unit 22 might also be configured to log the detected instances of presence of the mobile device 12 in specific information signal generator cells, such as for the purpose of statistical analyses, e.g. for determining building/area usage.

An advantage of the system of FIG. 1 is that many mobile devices 12 already exist which match the infrastructure system 10. Mobile devices 12 having magnetic field sensors and the ability to communicate via the interface 20 exist, e.g., in the form of mobile phones or other portable devices, such as portable multimedia reproduction devices, for example. Such mobile devices 12 are mostly also capable of executing additional software. In other words, it is mostly possible with such mobile devices 12 to load additional software onto the device, which software will then take over the corresponding device-side functions, such as recognizing and extracting the magnetic-field modulation information and transmitting the message to the data interface 18 via the interface 20, as well as the possible further functions as were mentioned above.

Since in addition, the communication channel 26, which may be wired or wireless, need only be present optionally, the expenditure used for implementing the infrastructure system 10 is also relatively low.

Now that the rough architecture and the functional principle of the infrastructure system of FIG. 1 has been described above, possible implementation details relating to the infrastructure system 10 will be addressed below. For example, the information signal generator 14 may comprise an antenna. This antenna may be configured as a coil with or without a core, a Helmholtz coil, or a ring antenna.

Figure 2:
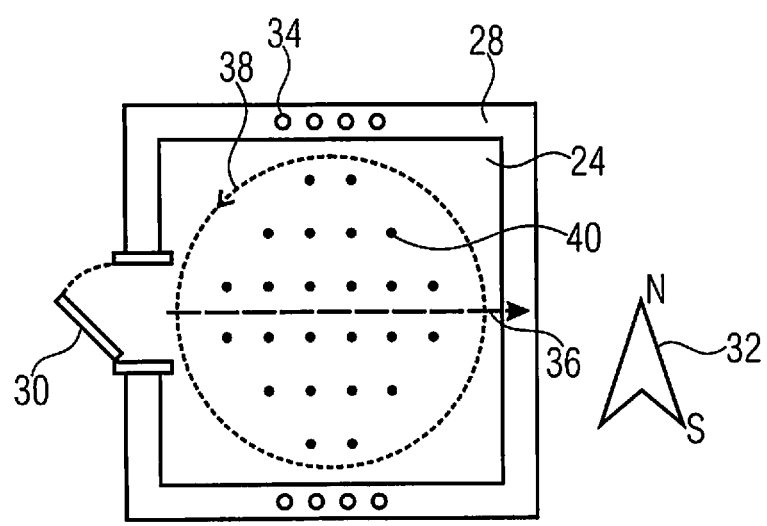
FIG. 2 shows a sectional top view of a room of a building which has drawn-in possible antenna coil paths for an information signal generator in accordance with an embodiment.

By way of example, FIG. 2 shows a room 24 with a surrounding wall 28 and a door 30, the direction of the earth's magnetic field at the location of the room 24 being additionally indicated at 32. As is shown in FIG. 2, the antenna may be configured, e.g., as a coil 34 guided along opposite sections of the wall 28, the ceiling and the floor which adjoin the room 24, so as to superimpose the earth's magnetic field, which extends along the north-south axis, with an artificial magnetic field. In the embodiment of FIG. 2, the artificial magnetic field extends along the coil axis 36 in a direction transverse to the earth's magnetic field. However, this alignment is not mandatory for the embodiments of the present invention. The path might also be parallel to the earth's magnetic field, which improves the installation expenditure and the installation possibilities. A path in a direction transverse to the earth's magnetic field, as is shown in FIG. 2, may make detectability of the existence of a magnetic field of the earth on the part of the mobile device easier, which will be addressed below, since the superposition of the earth's magnetic field with the artificial magnetic field results not only in a change in the magnitude of the effective magnetic field at the location of the mobile device 12, but also in a change of direction.

As may be seen in FIG. 2, it is also possible to place a horizontally extending coil 38 in the ceiling or the wall or the floor so as to essentially enclose the floor plan of the room 24 to produce a magnetic field 40 which extends vertically and, thus, again in the transverse direction to the earth's magnetic field. The number of windings of the coils 34 and/or 38, which act as antennas, may be one or more, and in particular, they may be configured as Helmholtz coils. For example, the coil 38 may comprise mutually parallel windings in an upper half and a lower half of the wall 28 or in the ceiling and the floor of the room 24. The same applies to the coil 34 with a horizontal magnetic field extension. The coil 34, too, may comprise two coil sections, which are spaced apart, along the shared coil axis 36, by an extension of the room 24 or by a slightly smaller distance in this direction.

In the above manner it would be ensured that modulation of the magnetic field 40 and/or 36 for the mobile device would be detectable only within the room 24, but not outside of same, and/or that the modulated information might be extracted from same since the magnetic field strength would rapidly decrease toward the outside. The existence of this magnetic field and/or its modulation is recognizable by the mobile device 12 in terms of orientation and strength of the resulting overall magnetic field. To achieve saving of energy for the mobile device 12, which due to its mobility is battery-powered in most cases, detection of the existence of the magnetic-field modulation is performed, in accordance with embodiments described below, with an energy consumption smaller than that of a mode into which the mobile device 12 transitions once the existence of an artificial magnetic field has been detected. As will be described below, a lower sampling frequency may be used, for example, for pure detection of the presence of an artificial magnetic field of an information signal generator than for the subsequent distinction as to whether the artificial magnetic field, the presence of which has been detected, corresponds to information and/or to a telegram of the information signal generator or originates from elsewhere, such as from a local deflection of the earth's magnetic field by a metal object in the immediate surroundings of the user of the mobile device.

The information signal generator 14 may be configured to generate a current, modulated with the information, through the antenna 34 and/or 38.

A modulation frequency at which the magnetic field is modulated with the information may be lower than 1 kHz, lower than 200 Hz or even lower than 50 Hz. Utilization of the frequency range below 50 Hz has advantages since this range is below the usual voltage supply frequencies of, e.g., 50 Hz or 60 Hz, and is thus not superimposed and/or disturbed by the latter, and since, as was already indicated above, the modulation frequency in this range may be sampled by magnetic field sensors such as the Hall sensors to be mentioned below or the like, which are used in the mobile device for magnetic field detection. Of course, the lower modulation frequency is accompanied by a lower transmission rate. This problem may be addressed by compressing (coding) the information and/or the telegram.

With regard to FIG. 2 it shall also be mentioned that the indicated possibilities for a magnetic field cell and antennas are examples only, and that especially as a function of the respective application, very small antennas may also be used since a range of a few millimeters is sufficient for many applications.

Figure 3:
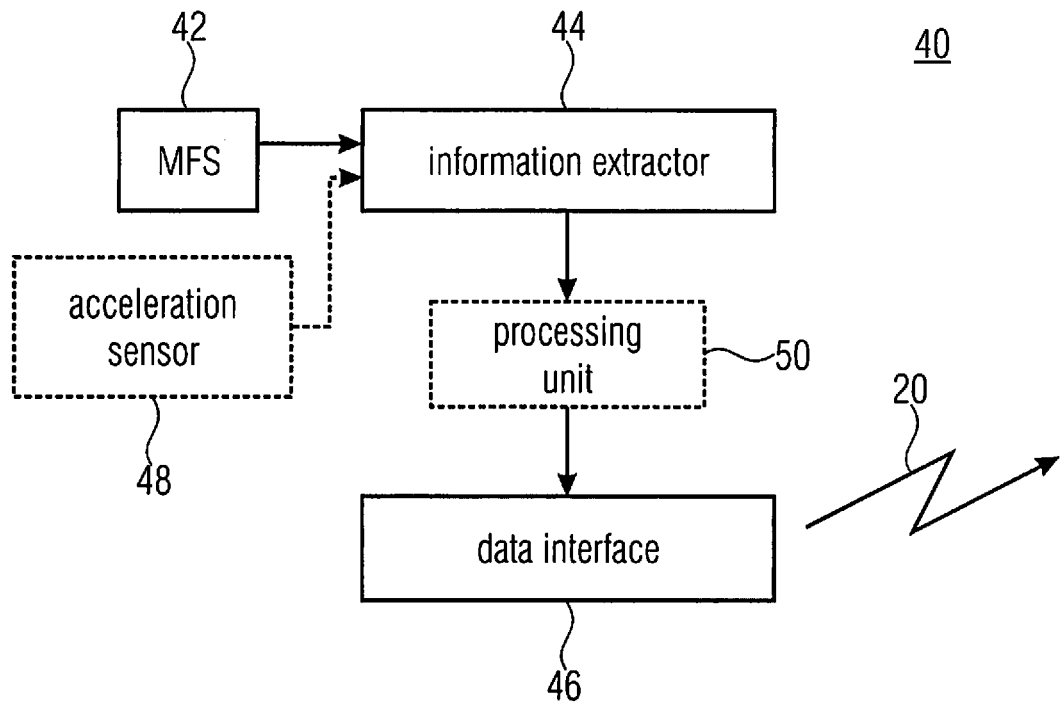
FIG. 3 shows a block diagram of a mobile device in accordance with an embodiment.

Now that possible implementation details for the infrastructure system 10 have been described above, an embodiment of a mobile device will be explained in more detail below with reference to FIG. 3. The mobile device of FIG. 3 is generally indicated by reference numeral 40 and includes a magnetic field sensor 42, an information extractor 44 as well as a data interface 46. As is indicated in FIG. 3, an acceleration sensor 48 and a processing unit 50 may optionally be provided as well.

The magnetic field sensor 42 detects a magnetic field which is present and which, for example—depending on where the mobile device 40 is currently located—can be the earth's magnetic field or a superposition of the earth's magnetic field with the artificially generated magnetic field of one of the information signal generators 14 and/or 16 (FIG. 1). For example, the magnetic field sensor 42 includes a Hall sensor, specifically a Hall sensor having 1, 2 or 3 axes. However, the magnetic field sensor 42 may also be a different sensor, such as an XMR sensor for measuring the magnetic field along one, two or three axes. As yet another alternative, it is possible for the magnetic field sensor 42 to comprise one or several coils whose coil axes are perpendicular to each other, for example, specifically each having a signal amplifier and an A/D converter or a multiplexer placed between the coils and the signal amplifier, the A/D converter adjoining the output of the signal amplifier.

The information extractor 44 is configured to extract the information from that magnetic field which has been detected by the magnetic field sensor 42, namely the information with which the magnetic field is modulated, as was described above. The data interface 46, in turn, is intended to transmit a message via the high-frequency electromagnetic wave interface 20, the message depending on the magnetic field modulation information, e.g. directly including same, possibly along with an ID of the mobile device 40, as was already described above.

The information extractor 44 may be configured to cyclically detect, in a detection mode, a superposition of the earth's magnetic field with an artificial magnetic field, namely the artificial magnetic field of one of the information signal generators, so as to only then perform information extraction, which mostly involves use of more power. For example, the information extractor 44 may be configured to detect the magnetic field vector in three mutually perpendicular spatial directions (such as in relation to a local reference system of the mobile device) and to evaluate, for presence detection purposes, a magnitude and/or an orientation of the magnetic field vector. For example, in the detection mode the sum of the three magnetic field vector components along the three mentioned mutually perpendicular spatial directions may be added and/or accumulated to obtain a measure of the magnetic field strength. The strength and/or orientation of the detected magnetic field can be compared to corresponding threshold values. The magnetic field strength may be compared, e.g., to a fixed threshold value. For example, the magnetic field generated by the information signal generators 16 is about as large or slightly larger than the earth's magnetic field strength, such as, e.g., larger than 40 µT or 60 µT. However, it is also possible to use a long-term average and/or a moving average of the sequence of samples of the sampled magnetic field strength and/or magnetic field orientation as the threshold value for the magnetic field strength and/or magnetic field orientation of each sample. In this context it is to be noted that deflections of the earth's magnetic field are present inside a building and in the vicinity of metallic objects, so that a suitable condition and/or a suitable threshold value should be used so as not to erroneously detect the existence of an additional magnetic field too often, on the one hand, and so as not to "overlook" an existing magnetic field of one of the information signal generators too often, on the other hand.

As was mentioned above, the information extractor may perform, e.g., long-term averaging of the output signal of the magnetic field sensor 42 so as to obtain a reference value, or threshold value, of the magnetic field strength and/or magnetic field orientation, such as across averaging time durations which amount to, e.g., more than 100 times the sampling interval and/or the repetition time duration used for sampling the magnetic field for detecting the presence of an artificial magnetic field. For example, the information extractor 44 may use the output signal of an acceleration sensor 48, which optionally is additionally provided, so as to continuously correct the magnetic field vector output of the magnetic field sensor 42 with regard to the location of the mobile device 40 in relation to the geographic (stationary) coordinate reference system during integration and/or so as to transform the samples—which are averaged within the context of potential long-term averaging for the purpose of determining a threshold value—to a shared reference system.

As will be described in the following, modulation with the modulation information, referred to as a telegram later on, may take place in a unipolar or bipolar manner. In the unipolar case, the explanations that have just been given may readily be applied to detecting the presence of the artificial magnetic field.

If the magnetic field sensor 42 is configured such that its magnetic field sampling operations represent an integration of the existing magnetic field over an integration time duration, such as over the sampling interval between successive sampling and/or readout times, said integration time duration being larger than a period duration of the magnetic field modulation, the sampling frequency at which the magnetic field sampling operations are performed by the magnetic field sensor 42 may be lower than the modulation frequency. However, if the magnetic field sensor 42 is configured such that the individual sampling operations are formed, e.g. instantaneously, over an integration time period which is shorter than the period length of the magnetic field modulation, sampling should be performed, during the detection mode, at a frequency higher than the modulation frequency. In the event of implementing the functionalities of the mobile device, as were described above, as a software that may be installed on different mobile devices having a processor and a corresponding operating system in order to be executed by the processor accordingly, it is advantageous for the sampling frequency to be higher than the modulation frequency so as not to be dependent on the corresponding implementation of the magnetic field sensor existing on the mobile device. In the event of bipolar modulation, for example magnetic field sensor sampling might be performed at a frequency more or less equal to or higher than the modulation frequency of the information signal generators, such as more than double the latter, for example. Upon detection of a superposition of the earth's magnetic field by an artificial magnetic field, the information extractor 44 switches to a scanning mode, for example. In the scanning mode, the information extractor 44 synchronizes itself, e.g., to a preamble with which the magnetic field is cyclically modulated by the information signal generators 14, whereupon the information extractor 44 subsequently extracts from the magnetic field the actual information with which the magnetic field is modulated. In the scanning mode, the sampling rate at which the magnetic field sensor samples the magnetic field may be increased as compared to the detection mode. The scanning mode may include, for detecting a telegram, correlating the sampled magnetic field curve with a reference signal or performing forward error detection by means of redundancy information in the telegram. If the correlation does not yield a sufficient maximum, or if the error detection yields errors, the scanning mode will be unsuccessful, and the information extractor will assume that the detected artificial magnetic field does not originate from one of the information signal generators. The scanning mode is limited in time, for example. The time duration of the scanning mode may depend on the maximum time duration to be expected of the telegram output by the information signal generators. After the scanning mode, the mobile device 12 returns, e.g., to the detection mode if no telegram has been detected.

The data interface 46 may include an optical sensor or a radio transmitter, for example; accordingly, the interface 20 may be an optical link or a radio link, as was already described above.

The mobile device 40 may be, in particular, e.g. a mobile phone, a portable computer, a portable multimedia reproduction device, or a mobile game console.

As will be explained in more detail below, it is also possible, in particular, for the data interface 46 to use an activatable and deactivatable link 20 and to be configured to temporarily store the information from the magnetic field as has been extracted from same by the extractor 44 while the link 20 is not activated.

The processing unit 50 may be, e.g., a processor capable of performing programs loaded onto the mobile device 40. Thus, the processing unit 50 may partly take over tasks of the information extractor 44 and/or of the data interface 46. The processing unit 50 may take over additional functions, such as performing encrypted communication via the interface 20 by means of a key which the latter has received from the magnetic field modulation via the information extractor 44.

Figure 4:
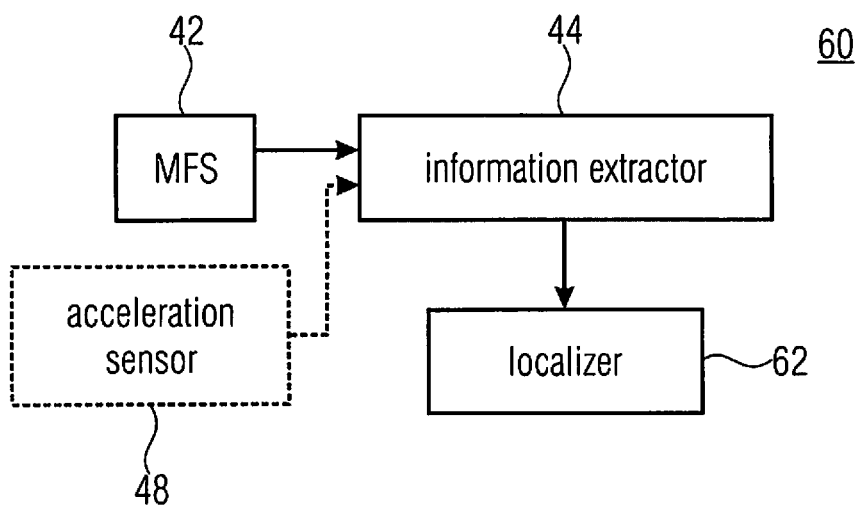
FIG. 4 shows a block diagram of a mobile device in accordance with a further embodiment.

FIG. 4 shows a further embodiment of a mobile device. The mobile device of FIG. 4 is generally indicated at reference numeral 60. Elements of the mobile device 60 which are identical with those of FIG. 3 have been provided with the same reference numerals, and repeated descriptions of said elements and their modes of operation will be dispensed with below in order to avoid repetition.

However, unlike the mobile device of FIG. 3, the mobile device 60 of FIG. 4 includes no data interface for the interface 20, but a localizer 62 which may, e.g., also be configured in the form of a processor having a corresponding program executing thereon. The localizer 62 is configured to determine a position of the mobile device 60 from location and/or identification information extracted from the modulated magnetic field by the information extractor 44. To this end, the localizer 62 looks up, e.g., in a corresponding database having the positions of the information signal generators stored therein. In other words, the localizer 62 takes over, according to the embodiment of FIG. 4, the task described above with reference to FIG. 1 in connection with the processing unit 22, such as looking up by means of the position information on a map or looking up by means of the identification information from the magnetic field modulation in a database which associates with each information signal generator identification the corresponding location of the corresponding information signal generator so as to look up in a corresponding map with the help of this information.

In the case of the embodiment of FIG. 4, the infrastructure system naturally need not have the data interface 18 available to it, unlike FIG. 1. The existence of the processing unit 22 is also not required in this case. The advantages of the overall system consisting of the mobile device 60 and the one or more information signal generators 14 and 16, however, result from the advantage of the locally more specifically defined extensions of the magnetic field cells of the information signal generator(s). For example, in this manner a different cryptographic key might be made available in each magnetic field modulation cell. In the left-hand half (without elements 18-22 and 26), FIG. 1 thus also represents an example of an in-house infrastructure system for a mobile device having a plurality of information signal generators 14 which are configured to generate a magnetic field which is modulated in each case with information which is different for the information signal generators 14. As was already mentioned, the modulation frequency may be lower than 50 Hz, and each information signal generator 14 may comprise an antenna configured as a coil with or without a core, a Helmholtz coil, or a ring antenna which is accommodated on a wall, a ceiling, a floor, a door, a door frame, a window or a window frame. Additionally or alternatively, accommodation in a carpet, a vehicle, in clothing, in a cash register or in a machine such as a ticket machine or any other technical device is also possible.

In the following, an embodiment of an information signal generator will be described with reference to FIG. 5. Thereafter, still further embodiments of mobile devices will be described. In the description which follows, the information used for modulating the magnetic field is sometimes also referred to as a telegram.

The information signal generator of FIG. 5 is generally indicated at the reference numeral 80 and includes a modulated current source 82 and an antenna 84, which may correspond, e.g., to one of the antennas 34 and/or 38 of FIG. 2. The modulated current source 82 may either be installed in a stationary manner, as was shown in FIG. 2, or on mobile objects, which may then be identified by the mobile devices, namely by means of magnetic field modulation. The modulated current source 82 includes a microprocessor 86 and a current source 88 as well as a switch 90. The current source 88 may be coupleable to an external energy supply 94, such as a public power supply network, via a terminal 92, and an output of the current source 88 may be connected to an output 96 of the modulated current source 82 via the switch 90 so as to selectively conduct or not conduct current through the antenna 84 connected to the terminal 96. The microcontroller 86 is connected to the switch and to the current source 88 and may additionally be connectable to the internet or a different data network 100 via an external data link 98; the above-mentioned communication via the channel 26 takes place, for example, via said link.

In the embodiment of FIG. 5, the magnetic field 102 is thus modulated by means of an electronic circuit and of the microprocessor 86. In particular, the current source 88 is optionally connectable to an electric energy source. The energy source is, for example, a battery, an accumulator, a power supply network or a communication network with integrated energy supply, such as in accordance with IEEE 802.3af/at. As was already mentioned above, the current may be modulated at very low frequencies, from e.g. 0 to approx. 50 Hz. Modulation may additionally take place in accordance with digital information, i.e. a telegram. Modulation of the current may take place either in a unipolar manner, in which case the current flow flows through the antenna 84 in one direction and, thus, the earth's magnetic field is deflected in one direction, or in a bipolar manner, in which case the polarity of the current flow through the antenna 84 is reversed, whereby the artificially generated magnetic field changes its direction upon polarity reversal. Optionally, the current strength may also be adapted manually by the user via a user interface not depicted in any detail in FIG. 5 or by the microcontroller 86, possibly via a corresponding configuration by the processing unit 22 (FIG. 1).

The telegram is cyclically repeated either continuously or intermittently. The telegram may optionally be coded, such as by means of NRZ, NRZi, Manchester, etc. The microprocessor 86 may either be specifically programmed for generating a telegram or may be reprogrammed, such as via the interface 98. The same applies to the optional adjustability of the current strength by means of the microcontroller 86. Reprogramming may be performed manually or via the previously mentioned communication network 100. The telegram may consist of several parts. For example, the telegram initially consists of a preamble for the purpose of receiver synchronization. This may be followed by an individual identification feature. Useful information which may possibly follow may optionally be compressed or encrypted.

The antenna 84 connected to the modulated current source 82 and generating a modulated magnetic field may vary in terms of shape, implementation and dimension. Airwaves with and without a core, Helmholtz coils, or circulators comprising one or more windings, etc. are possible.

A combination of the modulated current source 82 and/or of the current strength and of the antenna 84 determine a range of the signal and/or a range of a detectability of the magnetic field modulation for the mobile devices. In this manner, desired ranges of only a few centimeters, such as only within a Helmholtz coil, up to several meters may be generated. Very short ranges may typically be used for tap-proof transmission of cryptographic keys. Larger ranges are often desirable for localizing persons and objects.

According to the embodiment of FIG. 6, a mobile terminal device 120 includes a CPU. It may be a programmable mobile phone or smartphone, for example. An operating system may run on the CPU 122. The mobile terminal device 120 may include one or more network accesses, such as GSM/UMTS, LTE, WiMax, WLAN, etc., for broad-band communication with the internet 124. To this end, the mobile device 120 includes an antenna 124 so as to obtain a connection with the internet 124 in a wireless manner via the interface link 20. Additionally, the device 120 is equipped with an electronic compass which, according to the embodiment of FIG. 6, includes a Hall sensor 126 and is therefore capable of measuring static or slowly changing magnetic fields, i.e. may act as the above-mentioned magnetic field sensor 42.

A software SW1 has been installed on the terminal device 120, and its task initially consists, e.g., in cyclically detecting, as was mentioned above, the presence of an artificial magnetic field as is generated by, e.g., one of the information signal generators. This is achieved, for example, in that the accumulated field vector of the earth's magnetic field is observed, such as via accumulation of the three axes, for example. In the event that the Hall sensor 126 dips into the artificial magnetic field generated by one of the information signal generators, a change in the magnetic field, specifically both in terms of direction and in terms of strength, which does not naturally occur, is observed by the software SW1. As soon as such a change is detected, the scanning mode of the software SW1 is activated.

In the scanning mode, the Hall sensor 126 of the device 120 is interrogated as often as possible, such as, e.g., 50-100 times per second, until a telegram preamble is detected which consists, e.g., in a constant change in the magnetic field 102 in time with the bitrate. Since the maximum bitrate is roughly, e.g., up to about half of the interrogation rate, the software SW1 is able to identify the bitrate and the bit center with sufficient accuracy, so that further measurements may be performed at the correct bitrate and at the time of the bit center. Since the telegrams are relatively short, a small temporal inaccuracy does not negatively influence reception of the remaining telegram. Subsequently, the remaining telegram is processed, e.g. decoded, by the software SW1 and may possibly be made available to other applications on the mobile terminal device 120.

A further software SW2 on the mobile terminal device 120 monitors, e.g., the results of the software SW1 and reports changes in the telegram content, such as location information and cryptographic keys, etc., to a server in the internet via an internet link, the address of which server is made to be configurable and takes over, e.g., the tasks of the previously mentioned processing unit 22 of FIG. 1. In FIG. 6, the server is indicated by reference numeral 128.

FIG. 7 shows a mobile device 140 which may serve as a mobile location and identification memory. In addition to a magnetic sensor 142, it includes a microcontroller 144, a power supply 146, a memory 148, and a communication interface 150. The power supply 146 is, e.g., a battery or an accumulator and provides the microcontroller 144, the magnetic field sensor 142 and the memory 148 with power. The microcontroller 144 is coupled to the magnetic field sensor 142 and to the memory 148 as well as to the communication interface 150. As was already described above, the magnetic field sensor 142 may be a Hall sensor. However, just like the Hall sensor 126, the Hall sensor 142 may obviously also be formed by a different sensor for detecting static, as it were, or slowly changing magnetic fields 102, such as by means of coils with an adjacent amplifier and A/D converter. The communication interface may be a USB interface, for example. However, it is also possible for the communication interface 150 to perform a different wired or wireless specification. A software SW1 is installed on the device 140 so as to be processed by the microcontroller 144. In terms of its function, the software SW1 corresponds to the software SW1 of the embodiment of FIG. 6.

A further software SW3 is installed on the device 140 and ensures, when said software is being processed by the microcontroller 144, that the results and/or the information obtained by the software SW1 from the artificial magnetic field 102 when fulfilling its tasks as an information extractor are stored in the memory 148 of the device 140. The memory 148 of the mobile device 140 may be a non-volatile memory, for example. A volatile memory is also possible, however. As soon as the mobile device 140 is connected to a data processing device 152, such as a PC, for example, via the interface 150, the data processing device 152 reads out the data from the memory 148. This task is taken over, e.g., by a software SW4 which is executed on the data processing device 152. The read-out data is transmitted into a database 154 in the data processing device 152, which database 154 may be used by other applications and services, such as via the internet 156, for example. As has already been mentioned, the mobile memory 156 is supplied with current via, e.g., a battery, an accumulator or by means of external energization.

Just like in the embodiments of FIGS. 1-4, the messages forwarded to the outside by the mobile devices via the interface 20, 150 and 124, respectively, may contain the information extracted from the magnetic field modulation as well as the identification of the respective mobile device itself. For example, the message may comprise, e.g., a building ID of the building accommodating the respective information signal generator, the position ID of the respective information signal generator, a device ID of the mobile device, or alternatively or additionally any other ID which may be clearly associated with the device. For example, the ID may also be clearly associable to the respective software executed on the respective mobile device and taking over the previously mentioned tasks of the mobile device.

As was also briefly mentioned with reference to FIG. 6, the processing unit 22 may be a central server, such as a localization and identification server, or a system which may be used by an exclusive user group such as a company. The server 128 may include a database, for example, which has the localization and/or encryption information of the mobile devices as well as their device IDs stored therein. Said data may be accessed either by external applications and services, or a database application on the server 128 transmits, upon reception of specific localization or encryption information of a specific mobile device, further information to this specific device, said information being linked to said localization or key/encryption information, such as information on the whereabouts or an invoice in addition to optional meta information, such as a link and/or a URL or an application, in order to settle same.

Thus, the above embodiments also described, among other things, a localization and identification system having stationary or mobile telegram generators for generating magnetic fields for transmitting location and/or identification information to mobile or stationary devices with magnetic field sensors which are associated with a person or an object. The telegram generators may comprise a current source 82 and an antenna 84; the current source may be controlled by a microcontroller 86, and a current flow through the antenna 84 which contains telegram information is generated. The mobile terminal device may be equipped with a magnetic field sensor 42, 126 and 142, respectively, and have interne access such as via the interface 20, 124, for example. A software may execute on the respective terminal device, said software being able to extract the telegram information from the artificial magnetic field of the telegram generators and to make it available to further applications such as to the localizer 62, on the device or other devices 22 and/or 128 on the internet. However, a mobile device may also comprise a magnetic field sensor 142 and have a memory 148 as well as a communication interface 150 which is not active all the time. A software that may be executed on the mobile device is capable of extracting the telegram information from the artificial magnetic field of the telegram generators and store same in the memory 148 and fetch same from the latter as soon as the mobile memory is connected to a data processing device 152 via the communication interface.

Thus, the location and identification IDs of the mobile devices in the messages of same are received, possibly stored, processed further and/or linked, and the result of this processing is possibly provided to further services or mobile terminal devices, such as to the mobile terminal device which evaluated the magnetic field modulation.

As was mentioned above, coils with or without a core, Helmholtz coils, ring antennas of any geometric form and with one or several windings are suitable as magnetic field generation antennas. As was mentioned above, one may use a modulated magnetic field having a very low frequency such as less than 200 Hz or from 0 to 50 Hz; said low frequencies may provide advantages in indoor applications which are due to the property that the extensions of the magnetic field zones may be easily determined.

In the embodiment of FIG. 2, it was already pointed out that the antennas of the information signal generators may be integrated inside a building. Generally speaking, antennas of the information signal generators may be attached and/or arranged in stationary or mobile objects, particularly in ceilings, floors, walls, doors as well as door frames, tables, chairs, shelves, cabinets, other kinds of furniture, lamps, windows, carpets, vehicles (motorized or non-motorized), on land, on water, in the air or in space, in animals or in humans, e.g. in clothing, or the like.

The telegram generators and/or information signal generators may have an energy supply by means of a battery, such as a rechargeable battery, for example, power supply units for connecting to electric power supply networks, such as in accordance with IEEE 802.3af and IEEE 802.3at. In addition, they may have IP-based communication interfaces and be programmed, configured or interrogated via same.

In particular, the above-mentioned telegram generators, information signal generators and/or the infrastructure system may be part of a payment, cash register, cash dispenser or customer terminal system. In addition, it is possible for them to be part of an access control, time recording, routing, navigation or attendance control system. Moreover, it is possible for them to be part of an inventory, usage recording or usage administration system. They may also be part of a building automation system or part of a communication encryption system. Additionally, they may be part of a system for the purpose of advertising or of product marketing, or may be part of a game or of an entertainment system or be part of a piece of art.

As has been described in FIG. 7, the communication interface 150 may be configured in accordance with the USB standard. However, the communication interface 150 may also be implemented in accordance with IEEE 802.3a/b/g/n. However, the communication interface may also be implemented in accordance with GSM/UMTS/LTE/WiMax, which naturally also applies to the interfaces 20. Communication with the server 128 via a data network 124 is also possible, of course. The previously mentioned communication interfaces may naturally also be implemented in accordance with the Bluetooth standard or in accordance with IEEE 802.15.4 (ZigBee).

With regard to the description of the present application in the introduction to the description, the above embodiments may be associated with the group of short-range systems and may be employed, however, either exclusively or in combination with large-range systems as were mentioned in the introduction to the description of the present application.

In particular, the following fields of possible application therefore result for the present embodiments described above, namely indoor navigation, asset and resource management, localization and identification (persons and objects), transmission of signatures for encrypting communication channels, access control, time recording, building automation including audiovisual systems, security, user-specific information and advertising, payment functions, games and entertainment, multimedia-based art, customer programs (loyalty programs), statistical analyses (building/area usage).

Even though specific examples of possible antennas 34, 38 and 84, respectively, have been described above, it shall be pointed out that any antenna with which a magnetic field may be generated may be employed. By analogy, this applies to the above magnetic field sensors.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device), such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the interne.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An infrastructure system for a mobile device, the mobile device having an energy source which is a battery or an accumulator, the infrastructure system comprising:
   an information signal generator configured to generate a magnetic field modulated with information, the magnetic field to be detected through a Hall sensor or an x-magneto resistive (XMR) sensor;
   a data interface configured to receive a message, which depends on the information, from the mobile device via a high-frequency electromagnetic wave interface, wherein the high-frequency electromagnetic wave interface comprises a radio link and/or an optical link; and
   a processor connected to the data interface and configured to check the message for a match with the information, to localize the mobile device if the message matches with the information,
   wherein the information signal generator is configured such that a modulation frequency at which the magnetic field is modulated with the information corresponds to a bitrate of the information and is lower than 1 kHz, and
   wherein the information signal generator is configured to perform the modulation at the modulation frequency in a unipolar or bipolar manner so that the information is detectable by polling a magnetic field sensor at the bitrate.

2. The infrastructure system as claimed in claim 1, wherein the information signal generator comprises an antenna configured as a coil with or without a core, Helmholtz coil, or ring antenna.

3. The infrastructure system as claimed in claim 2, wherein the information signal generator is configured to generate a current, modulated with the information, through the antenna.

4. The infrastructure system as claimed in claim 2, wherein the antenna is accommodated in furniture, a wall, a ceiling, a floor, a door, a door frame, a lamp, a window, a carpet, a vehicle, clothing, a cash register, a machine or a window frame.

5. The infrastructure system as claimed in claim 1, wherein the information signal generator is configured such that a modulation frequency at which the magnetic field is modulated with the information is lower than 50 Hz.

6. The infrastructure system as claimed in claim 1, wherein the processor is communicatively coupled to the information signal generator and is implemented to configure the information signal generator to adjust the information with which the information signal generator modulates the magnetic field.

7. The infrastructure system as claimed in claim 1, wherein the infrastructure system comprises a plurality of information signal generators, the information of which comprises mutually different location and/or ID information, and wherein the processor is configured to index, by means of the message, an entry in a database from a plurality of entries of the database, each of the plurality of entries being associated with one of the plurality of information signal generators.

8. The infrastructure system as claimed in claim 7, wherein the processor is configured to perform localization of the mobile device by means of the index.

9. The infrastructure system as claimed in claim 7, wherein the processor is configured to extract an ID of the mobile device from the message and to instruct the information signal generator to modulate the magnetic field with a message intended for the mobile device.

10. The infrastructure system as claimed in claim 1, wherein the information signal generator is arranged such that the generated magnetic field extends in a direction transverse to the earth's magnetic field at the location of the information signal generator.

11. The infrastructure system of claim 1, wherein the bitrate of the information and the modulation frequency are lower than 1 kHz.

12. The infrastructure system as claimed in claim 1, wherein the information signal generator is configured such that the modulation frequency and the bitrate are lower than 50 Hz.

13. The infrastructure system as claimed in claim 1, further comprising a first coil guided along a first direction, and a second coil extended in a second direction.

14. The infrastructure system as claimed in claim 13, wherein the first coil is guided along walls, and the second coil is guided along opposite sections of walls.

15. A mobile device comprising:
- a magnetic field sensor for detecting a magnetic field generated by an infrastructure system, wherein the magnetic field sensor comprises a Hall sensor or an x-magneto resistive (XMR) sensor;
- an information extractor configured to extract from the magnetic field information with which the magnetic field is modulated in a unipolar or bipolar manner at a modulation frequency which corresponds to a bitrate of the information and is lower than 1 kHz, by polling the magnetic field sensor at the bitrate; and
- a data interface for transmitting to the infrastructure system, via a high-frequency electromagnetic wave interface, a message which depends on the information, wherein the high-frequency electromagnetic wave interface comprises a radio link and/or an optical link, and
- an energy source, which is a battery or an accumulator.

16. The mobile device as claimed in claim 15, wherein the information extractor is configured to cyclically detect, in a detection mode, a superposition of the earth's magnetic field with an artificial magnetic field, and to extract, upon detection of the superposition of the earth's magnetic field with the artificial magnetic field, that information with which the magnetic field is modulated.

17. The mobile device as claimed in claim 15, wherein the information extractor is configured to cyclically detect, in a detection mode, a superposition of the earth's magnetic field with an artificial magnetic field, and, upon detection of the superposition of the earth's magnetic field with the artificial magnetic field, to switch to a scanning mode and to synchronize itself, during the scanning mode, to a preamble with which the artificial magnetic field is modulated, and to subsequently extract the information with which the magnetic field is modulated.

18. A system of an infrastructure system as claimed in claim 1 and of a mobile device as claimed in claim 17.

19. The mobile device as claimed in claim 15, wherein the data interface comprises an optical transmitter and the high-frequency electromagnetic wave interface is an optical link, or the data interface comprises a radio transmitter and the high-frequency electromagnetic wave interface is a radio link.

20. The mobile device as claimed in claim 15, wherein the data interface is configured such that the message comprises the information with which the magnetic field is modulated and an ID of the mobile device.

21. The mobile device as claimed in claim 15, wherein the mobile device is a mobile phone, a portable computer, a portable multimedia reproduction device or a game console.

22. The mobile device as claimed in claim 15, wherein the data interface uses an activatable link and is configured to temporarily store the information with which the magnetic field is modulated while the link is not activated.

23. The mobile device as claimed in claim 15, wherein the modulation frequency lower than 50 Hz.

24. The mobile device as claimed in claim 15, wherein the bitrate and the modulation frequency are lower than 1 kHz.

25. The mobile device as claimed in claim 15, wherein the information extractor is configured to detect via the magnetic field sensor a magnetic field vector of the magnetic field in three mutually perpendicular spatial directions and to evaluate a direction of the magnetic field to extract the information from the magnetic field.

26. The mobile device as claimed in claim 15, further comprising an acceleration sensor, wherein the information extractor uses the output signal of the acceleration sensor to continuously correct the magnetic field vector output of the magnetic field sensor with regard to the location of the mobile device in relation to a coordinate reference system.

27. A method of providing an infrastructure for a mobile device, the mobile device having an energy source which is a battery or an accumulator, the method comprising:
- generating a magnetic field modulated with information in a unipolar or bipolar manner at a modulation frequency which corresponds to a bitrate of the information and is lower than 1 kHz so that the information is detectable by polling a magnetic field sensor at the bitrate, the magnetic field to be detected through a Hall sensor or an x-magneto resistive (XMR) sensor;
- receiving a message from the mobile device via a high-frequency electromagnetic wave interface, wherein the high-frequency electromagnetic wave interface comprises a radio link and/or an optical link; and
- checking the message for a match with the information, to localize the mobile device if the message matches with the information.

28. The method as claimed in claim 27, wherein the modulation frequency is lower than 50 Hz.

29. The method of claim 27, wherein the bitrate and the modulation frequency are lower than 1 kHz.

30. A method of operating a mobile device comprising a magnetic field sensor for detecting a magnetic field generated by an infrastructure system and an energy source which is a battery or an accumulator, the method comprising:
- extracting from the magnetic field information with which the magnetic field is modulated in a unipolar or bipolar manner at a modulation frequency which corresponds to a bitrate of the information and is lower than 1 kHz, by polling the magnetic field sensor at the bitrate, the magnetic field to be detected through a Hall sensor or an x-magneto resistive (XMR) sensor; and
- transmitting to the infrastructure system, via a high-frequency electromagnetic wave interface, a message which depends on the information, wherein the high-frequency electromagnetic wave interface comprises a radio link and/or an optical link.

31. The method as claimed in claim 30, wherein the modulation frequency lower than 50 Hz.

32. The method of claim 30, wherein the bitrate and the modulation frequency are lower than 1 kHz.

33. A non-transitory computer-readable medium storing a computer program comprising a program code for performing a method of providing an infrastructure for a mobile device having an energy source which is a battery or an accumulator, said method comprising:
- generating a magnetic field modulated with information in a unipolar or bipolar manner at a modulation frequency which corresponds to a bitrate of the information and is lower than 1 kHz so that the information is detectable by polling a magnetic field sensor at the bitrate, the magnetic field to be detected through a Hall sensor or an x-magneto resistive (XMR) sensor;
- receiving a message from the mobile device via a high-frequency electromagnetic wave interface wherein the high-frequency electromagnetic wave interface comprises a radio link and/or an optical link; and
- checking the message for a match with the information, so as to localize the mobile device,
- when the program runs on a computer.

34. A non-transitory computer-readable medium storing computer program comprising a program code for performing a method of operating a mobile device comprising a magnetic field sensor for detecting a magnetic field generated by an infrastructure system, and an energy source which is a battery or an accumulator, the method, said method comprising:
- extracting from the magnetic field information with which the magnetic field is modulated in a unipolar or bipolar manner at a modulation frequency which corresponds to a bitrate of the information and is lower than 1 kHz, by polling the magnetic field sensor at the bitrate, the magnetic field to be detected through a Hall sensor or an x-magneto resistive (XMR) sensor; and
- transmitting to the infrastructure system, via a high-frequency electromagnetic wave interface, a message which depends on the information, wherein the high-frequency electromagnetic wave interface comprises a radio link and/or an optical link, when the program runs on a computer.

35. An infrastructure system for a mobile device having an energy source which is a battery or an accumulator, the infrastructure system comprising:
- an information signal generator configured to generate a magnetic field modulated with information, the magnetic field to be detected through a Hall sensor or an x-magneto resistive (XMR) sensor;
- a data interface configured to receive a message from the mobile device via a high-frequency electromagnetic wave interface, wherein the high-frequency electromagnetic wave interface comprises a radio link and/or an optical link; and
- a processor connected to the data interface and configured to check the message for a match with the information,
- wherein the information signal generator is configured modulate the magnetic field with the information
- in a unipolar or bipolar manner so that a bitrate of the information and a modulation frequency at which the magnetic field is modulated are lower than 1 kHz and the information is detectable by polling a magnetic field sensor at the bitrate.

* * * * *